United States Patent [19]

Kondo et al.

[11] 4,442,822

[45] Apr. 17, 1984

[54] IGNITION POSITION CONTROLLING APPARATUS FOR MULTICYLINDER INTERNAL COMBUSTION ENGINE

[75] Inventors: Tetsuya Kondo; Tadashi Nishi, both of Shizuoka, Japan

[73] Assignee: Kokusan Denki Co., Ltd., Shizuoka, Japan

[21] Appl. No.: 416,910

[22] Filed: Sep. 13, 1982

[30] Foreign Application Priority Data

Oct. 22, 1981 [JP] Japan ................. 56-169031

[51] Int. Cl.³ ............................................. F02P 5/00
[52] U.S. Cl. ..................................... 123/643; 123/613; 123/617; 123/414; 123/476
[58] Field of Search ................. 123/612, 613, 617, 643, 123/146.5 R, 414, 416, 417, 476, 477, 494

[56] References Cited

U.S. PATENT DOCUMENTS

| | | | |
|---|---|---|---|
| 3,621,826 | 11/1971 | Chrestensen | 123/613 |
| 3,998,193 | 12/1976 | Ires et al. | 123/416 |
| 4,181,884 | 1/1980 | Shirasaki et al. | 123/414 |
| 4,250,846 | 2/1981 | Menard | 123/414 |
| 4,265,210 | 5/1981 | Hanisko | 123/476 |
| 4,265,211 | 5/1981 | Meloeny | 123/416 |
| 4,284,052 | 8/1981 | Hanisko | 123/476 |
| 4,338,903 | 7/1982 | Bolinger | 123/476 |
| 4,352,545 | 10/1982 | Menard et al. | 123/414 |

Primary Examiner—Parshotam S. Lall
Attorney, Agent, or Firm—Pearne, Gordon, Sessions, McCoy, Granger & Tilberry

[57] ABSTRACT

An ignition position controlling apparatus for a multicylinder internal combustion engine is disclosed which is capable of generating clock pulses and cylinder discriminating signals for detecting proper angular positions necessary to determine the ignition positions of cylinders of the engine using an inductor-type signal generator simple in construction which includes signal generating means in number corresponding to the number of cylinders of the engine and a single disc-like toothed inductor.

8 Claims, 5 Drawing Figures

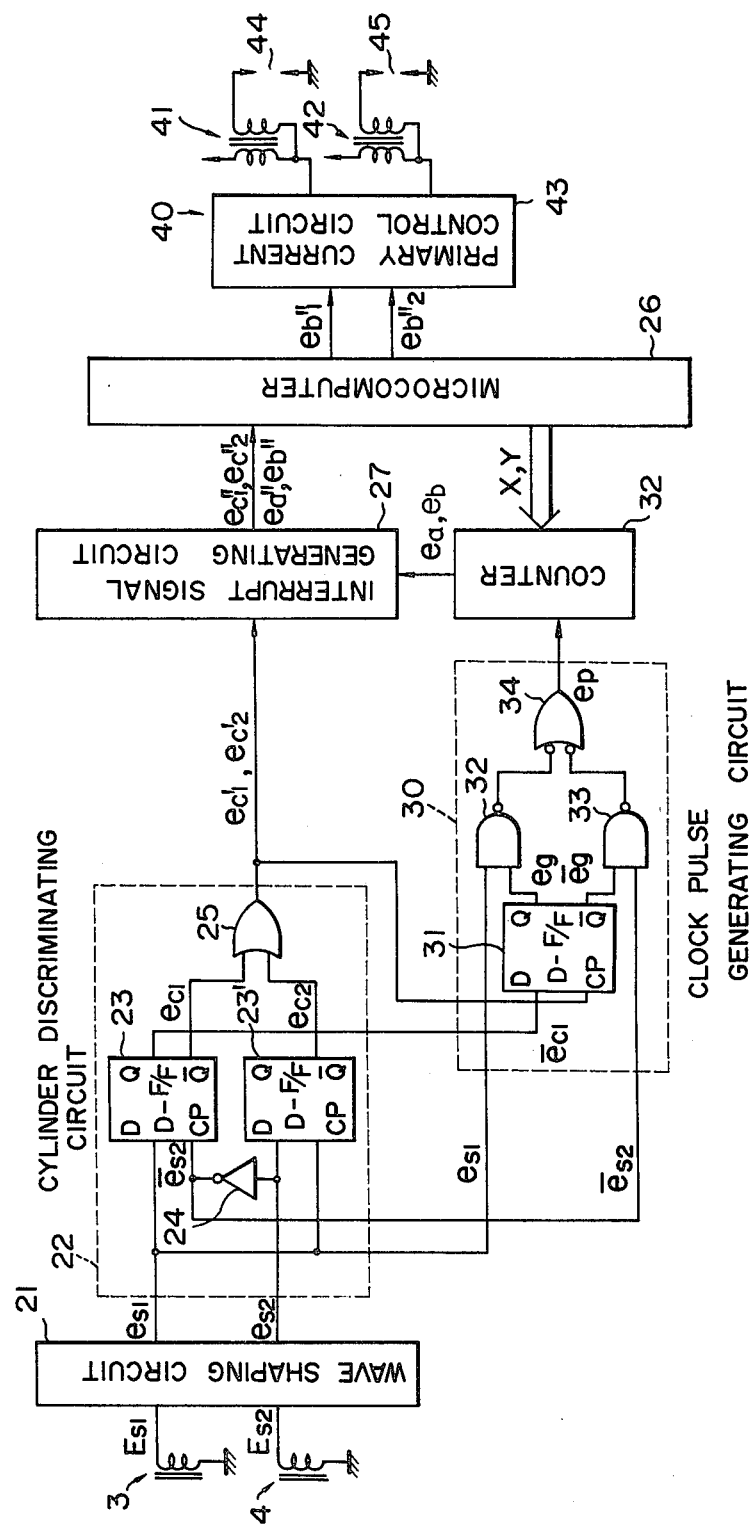

IGNITION POSITION CONTROLLING APPARATUS FOR MULTICYLINDER INTERNAL COMBUSTION ENGINE

BACKGROUND OF THE INVENTION

1. Field of the Invention

This invention relates to an ignition position controlling apparatus for a multicylinder internal combustion engine, and more particularly to an apparatus for properly controlling ignition positions of cylinders of a multicylinder internal combustion engine using a microcomputer.

2. Description of the Prior Arts

A control apparatus of such type is generally constructed to apply to a microcomputer a clock pulse generated every fixed angle in synchronism with the rotation of an engine and a cylinder discriminating signal generated at a position predetermined with respect to each cylinder during one rotation of the engine and count a predetermined number of clock pulses on the basis of the position at which each of the cylinder discriminating signals is generated, to thereby obtain an angular data necessary to determine the ignition position of each cylinder. Also, the rotational speed of the engine is detected by measuring time during which a fixed number of clock pulses are generated, and the ignition position of each cylinder is determined depending upon the detected rotational speed.

When an ignition apparatus of the type of interrupting a current is used in an ignition system for a multicylinder internal combustion engine which is adapted to interrupt a current flowing through a primary winding of each of ignition coils at the ignition position, such control apparatus is adapted to determine the position of allowing the flow of a current through the primary winding to be initiated by counting a predetermined number of clock pulses on the basis of the position at which each of cylinder discriminating signals is generated, in which an angle at which the primary current flows is controlled by changing the number of clock pulses to be counted depending upon the rotational speed of the engine.

In view of the foregoing, it will be noted that an ignition position controlling apparatus of such type needs clock pulses generated every fixed rotational angle to provide a data on angular positions and cylinder discriminating signals for providing a data necessary to determine a reference position at which the number of clock pulses with respect to each cylinder starts to be counted.

A conventional control apparatus of such type which has been used for such purpose is constructed to separately generate clock pulses and cylinder discriminating signals by means of an inductor-type signal generator. Therefore, it requires two inductors. The conventional control apparatus has a further disadvantage of requiring a single signal generating means for generating clock pulses and a plurality of signal generating means for generating cylinder discriminating signals in number corresponding to the cylinders, resulting in the signal generator being complicated in construction and oversized. Thus, the conventional control apparatus requires a wide space in order to install the signal generator therein, this resulting in the control apparatus being unsuitable for an engine of a small size such as, for example, an internal engine for a motor bike.

BRIEF SUMMARY OF THE INVENTION

The present invention has been made in view of the foregoing disadvantages of the prior art.

Accordingly, it is an object of the present invention to provide an ignition position controlling apparatus for a multicylinder internal combustion engine capable of generating clock pulses and cylinder discriminating signals for detecting proper angular positions necessary to determine the ignition positions of cylinders of the engine using an inductor-type signal generator simple in construction which includes signal generating means in number corresponding to the number of cylinders of the engine and a single disc-like toothed inductor.

It is another object of the present invention to provide an ignition position controlling apparatus for a multicylinder internal combustion engine capable of obtaining clock pulses by means of signals supplied from signal generating means in number corresponding to the number of cylinders of the engine without using a particular signal generating means for generating the clock pulses.

In accordance with the present invention, there is provided an ignition position controlling apparatus for a multicylinder internal combustion engine which is adapted to apply to a microcomputer clock pulses generated every predetermined angle in synchronism with the rotation of the engine and a cylinder discriminating signal generated at a predetermined position with respect to each cylinder during one rotation of the engine and count a predetermined number of clock pulses on the basis of the position at which each of the cylinder discriminating signals is generated, to thereby obtain an angle data necessary to control the ignition position of each cylinder, comprising an inductor-type signal generator including a disc-like toothed inductor rotated in synchronism with the engine which has a plurality of first teeth and a single second tooth of a width larger than that of one of the first teeth arranged at regular angular intervals on the periphery thereof and signal generating means of n in number (n being an integer of 2 or more) adapted to induce signals due to the variation in magnetic flux caused by the teeth of the inductor, the signal generating means generating signals of n in number different in phase from each other; a wave shaping circuit converting the signals of n in number generated from the signal generating means to signals of a pulse shape and generating pulse trains of n in number different in phase from each other; a clock pulse generating circuit selecting in turn the pulse train of a smaller width generated due to the facing of the first teeth with the signal generating means from the pulse trains every 1/n rotation of the inductor to generate the clock pulses; and a cylinder discriminating circuit, when each pulse signal of the pulse trains generated from the wave shaping circuit rises or falls, holding the level of the remaining pulse signals to generate the cylinder discriminating signals.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference characters designate the same or similar parts throughout the figures thereof and wherein:

FIG. 2 is a block diagram showing an electrical construction of an embodiment of an ignition position controlling apparatus according to the present invention;

DETAILED DESCRIPTION OF THE PREFERRED EMBODIMENTS

Figure 1A:
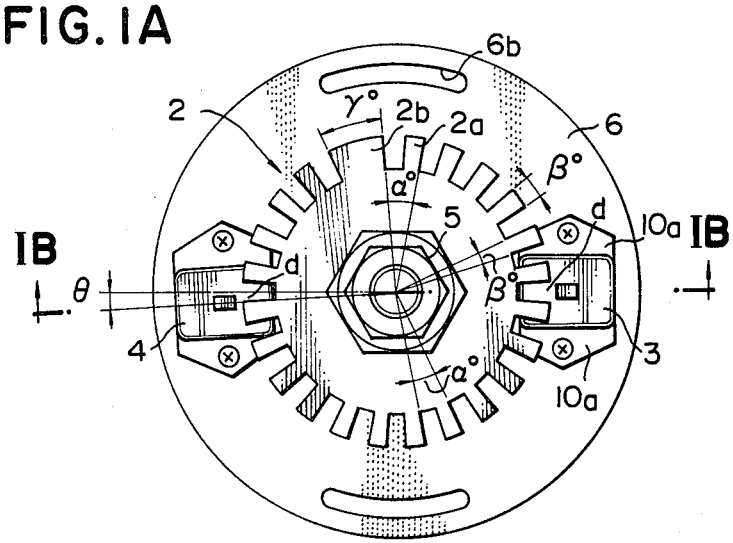
FIG. 1A is a front view illustrating a preferable example of an inductor-type signal generator used in an ignition position controlling apparatus of the present invention.
Figure 1B:
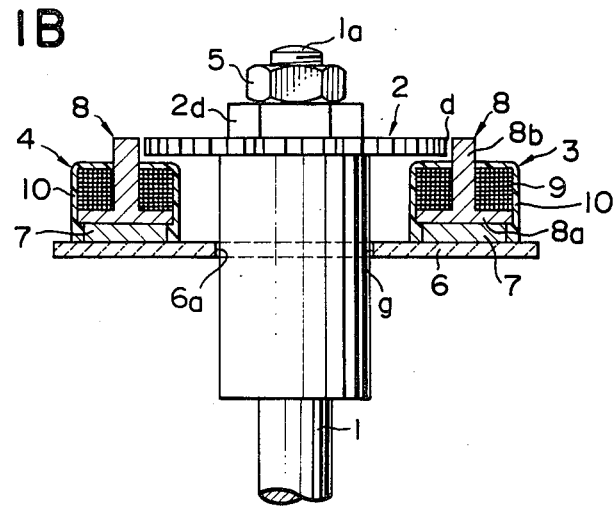
FIG. 1B is a sectional view taken along the line IB—IB of FIG. 1A.

FIGS. 1A and 1B show one example of an inductor-type signal generator used in the present invention, wherein reference numerals 1 and 2 designate a shaft such as a crank shaft rotated in synchronism with an engine (not shown) and a disc-like toothed inductor fitted on the shaft 1, respectively; and reference numerals 3 and 4 designate a signal generating means or signal pick up. The essential portion of the signal generator is composed of the disc-like toothed inductor 2 and the signal generating means 3 and 4. The disc-like toothed inductor 2 comprises a disc formed of a magnetic material such as iron of which the peripheral portion is provided with first teeth $2a$ of $360°/\alpha° - 2$ in number and a single second tooth $2b$. The first teeth $2a$ are arranged at regular angular intervals of $\alpha$ degree and the second tooth $2b$ has a central angle of $\gamma$ degree which corresponds to the sum of an angle of $\alpha$ degree for the adjacent two of the first teeth and an angle of $\beta$ degree between the adjacent two first teeth. The second tooth is arranged at angular intervals of $(\alpha - \beta)$ degree with respect to the first teeth disposed adjacent to the second tooth which equals to the angle of a groove defined between the adjacent two of the first teeth. In the example illustrated, $\alpha$, $\beta$ and $\gamma$ are determined to be 15, 7.5 and 22.5, respectively, and the first teeth are twenty-two in number.

The inductor 2 is provided at the central portion thereof with an opening and the shaft 1 is fitted at the tip section $1a$ thereof in the opening. The inductor 2 is concentrically fixed with respect to the shaft 1 by means of a nut 5 engaged with the screw portion of the tip section $1a$. In FIG. 2B, reference numeral $2d$ indicates a tool engaging portion of the shaft 1 hexagonal in section which serves to prevent the free rotation of the inductor with respect to the shaft 1 in the operation of mounting or dismounting the inductor. In the Example, the tool engaging portion $2d$ is formed integral with the inductor 2. In such case, it is preferable that the inductor 2 and the shaft 1 are respectively formed in hexagonal shape in section at the portions thereof engaged with each other in order to more effectively prevent the rotation of the inductor 2 with respect to the shaft 1. Alternatively, the rotation of the inductor may be prevented using a suitable means such as a key or the like.

The signal generator further includes a base plate 6 for mounting the signal generating means 3 and 4 thereon. The base plate 6 has an opening $6a$ provided at the central portion thereof through which the shaft 1 is inserted, with a gas g of a small distance being defined therebetween. The base plate 6 also has curved slots $6b$ provided at the periphery thereof through which bolts (not shown) are inserted to fix the base plate with respect to a cover of the engine or the like.

Each of the signal generating means 3 and 4 includes a permanent magnet 7 magnetized in the thickness direction of the base plate 6 which is disposed on the base plate 6, an iron core 8 having a base portion $8a$ disposed on the permanent magnet 7 and a portion $8b$ upwardly extending from the base portion $8a$ to the position adjacent to the peripheral surface of the inductor 2, and a signal coil 9 wound on the extending portion $8b$ of the core 8. The core 8 is disposed to allow the side surface of the top section of the extending portion $8b$ to be opposed to the peripheral surface of each tooth of the inductor 2, with a gap d being defined therebetween. The magnet 7 and the core 8 having the coil 9 wound thereon are supported together by a resin mold element 10 and are securely mounted with respect to the base plate 6 by fixing the mounting portion $10a$ of the element 10 to the base plate 6 by means of a screw or the like.

In the signal generator shown in FIGS. 1A and 1B, magnetic flux generated from each of the magnets 7 flows through a magnetic path composed of the magnet 7, the extending portion $8b$ of the core 8, the teeth $2a$ or tooth $2b$ of the inductor 2, the shaft 1, the base plate 6, and the magnet 7. When each tooth of the inductor 2 passes across the extending portion $8b$ of the core 8, the magnetic flux crossing the coil 9 is changed so that a voltage may be induced across the coil 9.

In the present invention, one of the two signal generating means 3 and 4, as shown in FIG. 1A, is arranged to deflect by an angle of $\theta$ from the position spaced 180 degree with respect to the other signal generating means. In the embodiment illustrated, $\theta$ is determined to be 3 degree. Wave forms of signal voltages $E_{s1}$ and $E_{s2}$ generated from the signal generating means 3 and 4 arranged in such manner as mentioned above are shown in FIGS. 3A and 3B, respectively.

Figure 3:
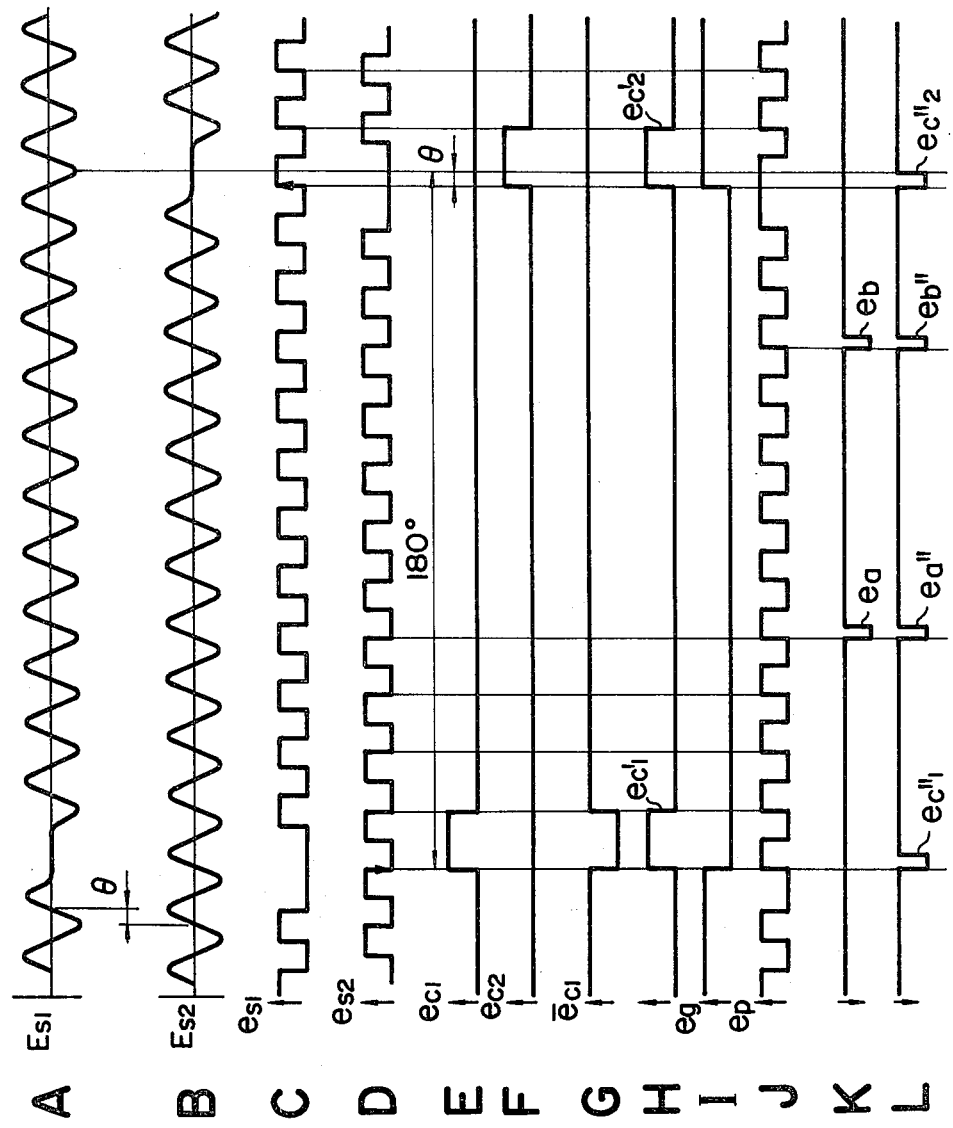
FIGS. 3A to 3L are wave forms for explaining the operation of the embodiment shown in FIG. 2.

The signal voltages $E_{s1}$ and $E_{s2}$, as shown in FIG. 2, are received by a wave shaping circuit 21 and shaped into pulse signals $e_{s1}$ and $e_{s2}$ as shown in FIGS. 3C and 3D, the pulse signals $e_{s1}$ and $e_{s2}$ being received by a cylinder discriminating circuit 22. The cylinder discriminating circuit 22 includes two D-type FLIP-FLOP circuits (hereinafter abbreviated to "D-F/F") 23 and 23', an INVERTER 24 connected between the data input D of the D-F/F 23' and the clock input CP of the D-F/F 23, and an OR circuit 25 receiving therein signals generated at the outputs $\overline{Q}$ of the D-F/F 23 and 23'. The data input D and clock input CP of the D-F/F 23 are respectively supplied thereto the pulse signal $e_{s1}$ and a signal $\overline{e}_{s2}$ obtained by inverting the phase of the pulse signal $e_{s2}$. To the data input D and clock input CP of the D-F/F 23' are supplied the pulse signals $e_{s2}$ and $e_{s1}$, respectively. The D-F/F 23 of the cylinder discriminating circuit 22 serves to hold the level of the pulse signal $e_{s1}$ at the moment when the pulse signal $e_{s2}$ falls, to thereby generate a cylinder discriminating signal $e_{c1}$ as shown in FIG. 3E from the output $\overline{Q}$; whereas, the D-F/F 23' acts to retain the level of the pulse signal $e_{s2}$ at the instant when the pulse signal $e_{s1}$ rises, to thereby generate a cylinder discriminating signal $e_{c2}$ as shown in FIG. 3F from the output $\overline{Q}$. This results in cylinder discriminating signals $e_{c'1}$ and $e_{c'2}$ alternately appearing at the output of the OR circuit 25 which have a phase delayed in amount corresponding to the delay time of the OR circuit 25, as shown in FIG. 3H. The cylinder discriminating signals $e_{c'1}$ and $e_{c'2}$ are supplied to an interrupt signal generating circuit 27 which generates interrupt signals with respect to a microcomputer 26, the circuit 27 serving to generate pulse-like interrupt signals $e_{c''1}$ and $e_{c''2}$ for discriminating cylinders of the engine when the cylinder discriminating signals $e_{c'1}$ and $e_{c'2}$ rise, as shown in FIG. 3L. Each of the cylinder discriminating signals $e_{c'1}$ and $e_{c'2}$ is determined to be generated at the position where the phase advances by a predetermined angle in relation to the dead center of each cylinder.

Clock pulses are generated by a clock pulse generating circuit 30. The clock pulse generating circuit 30, as shown in FIG. 2, includes a D-F/F 31, a NAND circuit 32 receiving therein an output signal from the output $\overline{Q}$ of the D-F/F 31 and the pulse signal $e_{s1}$, a NAND circuit 33 receiving therein an output signal from the output $\overline{Q}$ of the D-F/F 31 and the signal $\overline{e}_{s2}$ obtained by inverting the phase of the pulse signal $e_{s2}$, and an OR circuit 34 receiving therein outputs from the NAND circuits 32 and 33. The data input D of the D-F/F 31 is applied thereto a signal $\overline{e}_{c1}$ as shown in FIG. 3G which is generated at the output Q of the D-F/F 23 of the cylinder discriminating circuit 22 and the clock input CP of the D-F/F 31 is applied thereto the cylinder discriminating signals $e_{c'1}$ and $e_{c'2}$ generated from the OR circuit 25. The D-F/F 31 of the clock pulse generating circuit 30 allows a gate signal $e_g$ to be generated at the output Q thereof which is kept at a low level from the rising of the cylinder discriminating signal $e_{c'1}$ to the rising of the cylinder discriminating signal $e_{c'2}$ as shown in FIG. 3I, and a gate signal $\overline{e}_g$ to be generated at the output $\overline{Q}$ thereof which is obtained by inverting the phase of the gate signal $e_g$. This results in the NAND circuit 32 generating at the output thereof the pulse signal $e_{s1}$ from the rising of the cylinder discriminating signal $e_{c'2}$ to the rising of the cylinder discriminating signal $e_{c'1}$ and a voltage of a high level at the remaining intervals. Also, the NAND circuit 33 generates at the output thereof the pulse signal $\overline{e}_{s2}$ obtained by inverting the pulse signal $e_{s2}$ only from the rising of the cylinder discriminating signal $e_{c'1}$ to the rising of the cylinder discriminating signal $e_{c'2}$ and a voltage of a high level at the remaining intervals. Thus, the OR circuit 34 alternately generates at the output thereof the pulse signal $e_{s1}$ and the pulse signal $\overline{e}_{s2}$ obtained by inverting the pulse signal $e_{s2}$ every angle of 180 degree, as shown in FIG. 3J.

In the present invention, the pulse train of FIG. 3J is used as clock pulses $e_p$. Each of the clock pulses $e_p$ provides an angle data every angle of $360°/h = \alpha°$, wherein h is the number of teeth ($360°/\alpha°$) supposing that the inductor 2 is provided with only the first teeth $2a$. In the example shown in FIGS. 1A and 1B, h is 24. Thus, the rotating angle of a crank shaft of the engine can be positionally detected by counting the number of clock pulses. The clock pulses $e_p$ are received by a counter 32 which the microcomputer 26 instructs a predetermined number of clock pulses to be counted. The microcomputer 26, irrespective of the rotational speed of the engine, provides the counter 32 with a data X on a predetermined number of clock pulses to be counted every time when the interrupt signals $e_{c''1}$ and $e_{c''2}$ for discriminating the cylinders are received therein, so that the counter 32 starts to count the number of clock pulses $e_p$ when the clock pulses $e_p$ rise and generates a first carry signal $e_a$ (FIG. 3K) when the clock pulses of x in number are counted. The first carry signal $e_a$ is received by the interrupt signal generating circuit 27, which generates a pulse-like interrupt signal $e_{a''}$ for measuring the engine speed (FIG. 3L) when the first carry signal $e_a$ falls. When the interrupt signal $e_{a''}$ is received by the microcomputer 26, it measures time from the generation of the cylinder discriminating interrupt signal $e_{c''1}$ to the generation of the engine speed measuring signal $e_{a''}$ to calculate the speed of the engine. The microcomputer 26 also provides the counter 32 with a data Y on a predetermined number of clock pulses to be counted corresponding to the previously calculated engine speed when the engine speed measuring interrupt signal $e_{a''}$ is received therein. The data Y is adjusted in such a manner that it is large when the engine speed is low and becomes small as the engine speed becomes high. The counter 32 generates a second carry signal $e_b$ as shown in FIG. 3K when it gets through counting the predetermined number of clock pulses, and the interrupt signal generating circuit 27 generates an interrupt signal $e_{b''}$ for controlling a turn-on signal when the second carry signal $e_b$ falls.

The microcomputer 26 provides a primary current control circuit 43 with control signals $e_{b''1}$ and $e_{b''2}$ which control primary currents of ignition coils 41 and 42 of an ignition system 40 for the engine, to thereby control the turn-on angle of the primary currents and the ignition positions. In the embodiment illustrated, the primary current control circuit 43 is of the type of interrupting a current and includes semi-conductor switches such as transistor switches or the like (not shown) provided in parallel with the respective primary windings of the ignition coils 41 and 42 and an ignition source such as a battery (not shown) for flowing a current through each of the primary windings when the semi-conductor switches are turned on. The microcomputer 26 generates the turn-on signal $e_{b''1}$ for turning on the semi-conductor switch of allowing a primary current to flow through the first ignition coil 41 when it is applied thereto the turn-on angle controlling interrupt signal $e_{b''}$ generated prior to the cylinder discriminating interrupt signal $e_{c''1}$ shown in FIG. 3L, namely, the interrupt signal $e_{b''}$ generated at a predetermined position after the generation of the second cylinder discriminating signal $e_{c''2}$; and then it renders the turn-on signal $e_{b''1}$ zero at a predetermined position (the ignition position of the first cylinder of the engine) after receiving the first cylinder discriminating interrupt signal $e_{c''1}$, to thereby interrupt the semi-conductor switch. This allows the primary current of the ignition coil 41 to be interrupted and a high voltage to be induced across the secondary winding of the ignition coil 41, to thereby generate a spark at an ignition plug 44 of the first cylinder of the engine.

Then, the microcomputer 26, when receiving therein the turn-on signal controlling interrupt signal $e_{b''}$ shown in FIG. 3L, generates the turn-on signal $e_{b''2}$ for turning on the semi-conductor switch of allowing the primary current to flow through the second ignition coil 42, and then it renders the turn-on signal $e_{b''2}$ zero at a predetermined position (the ignition position of the second cylinder) after receiving therein the second cylinder discriminating interrupt signal $e_{c''2}$ to interrupt the semi-conductor switch. This allows a high voltage to be induced across the secondary winding of the ignition coil 42 and an ignition plug 45 provided in the second cylinder of the engine to generate a spark, to thereby accomplish the ignition of the second cylinder.

The positions of allowing the primary currents flowing through the ignition coils 41 and 42 to be interrupted are determined by the microcomputer 26 and are controlled so that the ignition positions advance with the engine speed in the middle and high speed regions of the engine. The positions of interrupting the primary currents are determined by counting a predetermined number of pulses generated from, for example, an oscillator provided in the microcomputer on the basis of the positions of receiving the first and second cylinder discriminating interrupt signals. As mentioned above, the positions of interrupting the primary currents are decided on the basis of the first and second discriminating interrupt signals of which the phases are deflected from each other by the angle of $\theta$ from 180 degree; therefore, when one of the two cylinders of the engine is adjusted to have its proper ignition position, the ignition position of the other cylinder is deflected by the angle of $\theta$ from its proper ignition position. In view of this point, the present invention is adapted to count time $\Delta t$ corresponding to the deflection angle of $\theta$ by means of the microcomputer to correct the timing of generating ignition time signals (signals of allowing the turn-on signals $e_{b''1}$ and $e_{b''2}$ to be rendered zero) by the time $\Delta t$ only with respect to the other cylinder.

Figure 4:
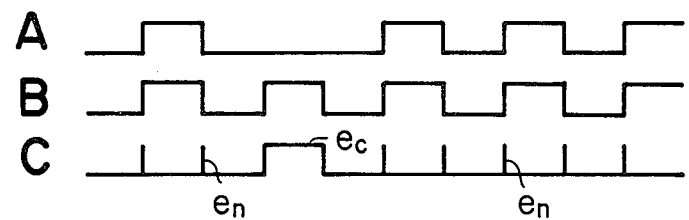
FIGS. 4A to 4C are wave forms for explaining the operation of the signal generator shown in FIG. 1 without causing a phase difference between signals obtained by the signal generator.

Supposing that, in the embodiment illustrated, the signal generating means 3 and 4 are arranged at the positions spaced 180 degrees from each other, the pulse signals obtained by wave-shaping the signals generated by the signal generating means are as shown in FIGS. 4A and 4B, respectively. In such case, if the both pulse signals have the same phase, a cylinder discriminating signal $e_c$ shown in FIG. 4C can be obtained by taking an EXCLUSIVE OR between the both pulse signals. However, a minute phase difference is generated between the voltages generated in the signal coils 3 and 4 due to the armature reaction of the signal generator and the like, this often causing a phase difference to be generated between the pulse signals of which the wave forms have been shaped. When taking an EXCLUSIVE OR between the both signals under the conditions that a minute phase difference exists between the both signals, a noise signal comprising pulses $e_n$ of a very small width is generated as shown in FIG. 4C; so that it is substantially impossible to discriminate the cylinders. On the contrary, as in the present invention, when allowing a phase difference to positively exist between the pulse signals $e_{s1}$ and $e_{s2}$ to keep the level of the other pulse signal when the one pulse signal falls and keep the level of the one pulse signal when the other pulse signal rises and rendering the phase difference $\theta$ smaller than the pulse width of each of the pulse signals $e_{s1}$ and $e_{s2}$; the voltages generated across the signal generating means 3 and 4 are not affected by the armature reaction and the like, to thereby allow the cylinder discriminating signals as shown in FIGS. 3E and 3F to be generated.

The number of teeth of the disc-like toothed indicator 2 may be odd or even. It is convenient that the phase difference between the signal voltages generated across the plural signal generating means is less than $\beta$ when $\beta$ is less than $\alpha/2$ and is less than $\alpha - \beta$ when $\beta$ is more than $\alpha/2$.

In the present invention, it is merely required that the second tooth $2b$ of the inductor 2 has a width larger than that of one of the first teeth $2a$, therefore, it is not critical that the second tooth $2b$ has a width twice that of one of the first teeth as in the example illustrated.

The present invention has been explained with respect to the two-cylinder internal combustion engine, however, it is of course that the present invention is applicable to the control of ignition positions of other multicylinder internal combustion engines such as a three-cylinder engine, a four-cylinder engine, a six-cylinder engine and the like. More particularly, when the embodiment mentioned above is further constructed in such a manner to connect two ignition plugs to each of the ignition coils 41 and 42 and simultaneously ignite the plugs, it can be applied to a four-cylinder internal combustion engine. The application of the present invention to a three-cylinder internal combustion engine can be accomplished by disposing at least one of three signal generating means to be arranged at intervals of 120 degree at a position deflected by a predetermined angle from the position set 120 degrees apart from the remaining signal generating means. In such case, cylinder discriminating signals can be obtained by providing a cylinder discriminating circuit formed in the substantially same manner as that in the above-mentioned embodiment so as to serve to keep the level of one of pulse signals having a phase difference $\theta$ therebetween which are obtained by shaping the waves of signals generated from the adjacent two signal generating means when the other pulse signal falls and keep the level of the other pulse signal when the one pulse signal falls. Also, clock pulses can be obtained selecting in turn three pulse signal trains every $\frac{1}{3}$ rotation which are obtained by wave-shaping three signals generated from the three signal generating means. Furthermore, in order to apply the present invention to a six-cylinder internal combustion engine, it is constructed in such a manner to connect two ignition plugs to each of three ignition coils of an ignition system for a three-cylinder engine as mentioned above and simultaneously ignite the ignition plugs.

As mentioned above, the embodiment illustrated is adapted to deflect the position of the particular signal generating means to allow the phase difference to exist between the pulse signals. When signal generating means of n in number are provided in the present invention, pulse signals different in phase from each other can be obtained by arranging the signal generating means at regular intervals of $360°/n$ wherein the relationship between $360°/n$ and $\alpha°$ is determined so that $360°/n$ is not a multiple of $\alpha°$.

The embodiment mentioned above is constructed to control the turn-on angle of the primary current of each of the ignition coils. However, when using an ignition system of the current interruption type in which an exciter coil of inducing a voltage in synchronism with the rotation of the engine is used as a power source and which is adapted to automatically turn on the transistor switch when one of half cycles rises, it is not required to control the turn-on angle because the position at which each of the primary currents starts to flow is determined by the output wave of the exciter coil. The control of the turn-on angle is not required also when an ignition system of the capacitor discharge type is used.

As explained in detail hereinbefore, the present invention is constructed in the manner that the disc-like toothed inductor is used as an inductor of the signal generator which has a group of teeth including the single tooth larger in width and the plural signal generating means provided in number corresponding to the number of cylinders generate the signals different in phase from each other from which the cylinder discriminating signals and clock pulses are obtained. Thus, it will be noted that the present invention is capable of simplifying and miniaturizing the signal generator because it comprises only the single inductor and the signal generating means in number corresponding to the number of cylinders. In addition, the present invention is constructed to obtain the data on the angle of a crank shaft every predetermined angle to control the ignition positions, thus, the operation at the low speed rotation of the engine in which the variation in rotation thereof frequently appears can be stably accomplished as compared to the conventional control apparatus of the type of controlling the ignition positions based on only time.

Obviously many modifications and variations of the present invention are possible in the light of the above teachings. It is therefore to be understood that within the scope of the appended claims, the invention may be practiced otherwise than as specifically described.

What is claimed is:

1. An ignition position controlling apparatus for a multicylinder internal combustion engine which is adapted to apply a microcomputer clock pulses generated every predetermined angle in synchronism with the rotation of the engine and a cylinder discriminating signal generated at a position predetermined with respect to each cylinder during one rotation of the engine and count a predetermined number of clock pulses on the basis of the position at which each of the cylinder discriminating signals is generated, to thereby obtain an angle data necessary to control the ignition position of each cylinder, comprising:

an inductor-type signal generator including a disc-like toothed inductor rotated in synchronism with said engine which has a plurality of first teeth and a single second tooth having a width larger than that of one of said first teeth arranged at regular angular intervals on the periphery thereof and signal generating means of n in number (n being an integer of 2 or more) adapted to induce signals due to the variation in magnetic flux caused by said teeth of said inductor, said signal generating means generating signals of n in number different in phase from each other;

a wave shaping circuit converting said signals of n in number generated from said signal generating means to pulse trains of n in number different in phase from each other and generating said pulse trains;

a clock pulse generating circuit selecting in turn any one of said pulse trains of n in number every 1/n rotation of said inductor and taking out from the selected pulse train pulse signals of a smaller width generated due to the facing of said first teeth with said signal generating means, to thereby generate said clock pulses; and a cylinder discriminating circuit, when each pulse signal of one of said pulse trains different in phase from each other generated from said wave shaping circuit rises or falls, holding the level of pulse signals of the remaining pulse trains, to thereby generate said cylinder discriminating signals.

2. An ignition position controlling apparatus for a multicylinder internal combustion engine which is adapted to apply to a microcomputer clock pulses generated every predetermined angle in synchronism with the rotation of the engine and a cylinder discriminating signal generated at a predetermined position with respect to each cylinder during one rotation of the engine and count a predetermined number of clock pulses on the basis of the position at which each of the cylinder discriminating signals is generated, to thereby obtain an angle data necessary to control the ignition position of each cylinder, comprising:

an inductor-type signal generator including a disc-like toothed inductor rotated in synchronism with said internal combustion engine which has a plurality of first teeth and a single second tooth having a width larger than that of one of said first teeth arranged at regular angular intervals on the periphery thereof and signal generating means of n in number (n being an integer of 2 or more) adapted to induce signals due to the variation in magnetic flux caused by said teeth of said inductor, said signal generating means generating signals of n in number different in phase from each other;

a wave shaping circuit converting said signals of n in number generated from said signal generating means to signals of a pulse shape and generating pulse trains of n in number different in phase from each other;

a clock pulse generating circuit selecting in turn the pulse train of a smaller width generated due to the facing of said first teeth with said signal generating means from said pulse trains every 1/n rotation of said inductor to generate the clock pulses; and a cylinder discriminating circuit, when each pulse signal of said pulse trains generated from said wave shaping circuit rises or falls, holding the level of the remaining pulse signals to generate said cylinder discriminating signals.

3. An ignition position controlling apparatus for a multicylinder internal combustion engine as defined in claim 2, wherein said signals different in phase from each other are generated by shifting the positions at which said signal generating means of n in number are arranged.

4. An ignition position controlling apparatus for a multicylinder internal combustion engine as defined in claim 2, wherein the number of said signal generating means is two, and one of said signal generating means is arranged at a position deflected by an angle of $\theta$ from 180 degree with respect to the other signal generating means.

5. An ignition position controlling apparatus for a multicylinder internal combustion engine as defined in claim 2, wherein the number of said signal generating means is three, two of said signal generating means are arranged at intervals of 120 degrees and the other of said signal generating means is arranged at intervals of 120 degrees $\pm\theta$ with respect to said two signal generating means.

6. An ignition position controlling apparatus for a multicylinder internal combustion engine as defined in claim 2, wherein said signal generating means of n in number are arranged at intervals of 360°/n, and the angular interval between the adjacent two of said first teeth is determined so that 360°/n does not become a multiple of said angular interval.

7. An ignition position controlling apparatus for a multicylinder internal combustion engine as defined in claim 2, wherein the number of said signal generating means is two; said wave shaping circuit generates two pulse trains; said clock pulse generating circuit takes out pulse signals of a smaller width generated due to the facing of said first teeth of said inductor with said signal generating means from one of said pulse trains while said inductor rotates one half of 360° and pulse signals of a smaller width generated due to the facing of said first teeth with said signal generating means from the other pulse train while said inductor rotates the other half of 360°, to thereby generate said clock pulses; and said cylinder discriminating circuit holds the level of pulse signals of said the other pulse train when the corresponding pulse signals of said one pulse train rise and the level of pulse signals of said one pulse train when the corresponding pulse signals of said the other pulse train fall, to thereby generate two cylinder discriminating signals.

8. An ignition position controlling apparatus for a multicylinder internal combustion engine as defined in claim 2, wherein each of said signal generating means comprises a core, a signal coil wound on said core and a magnet coupled to said core to generate a magnetic flux which flows through said core.

* * * * *